May 8, 1962  S. N. MERCER  3,033,359
DISPOSABLE LENS SHIELD
Filed May 3, 1960
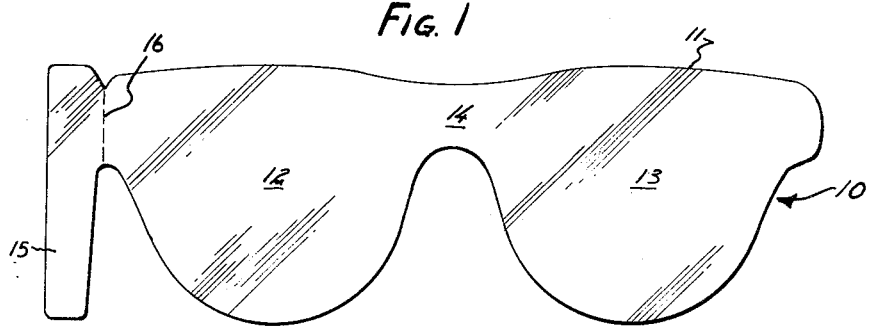
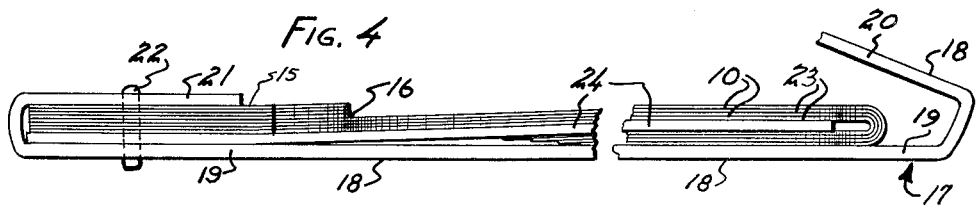
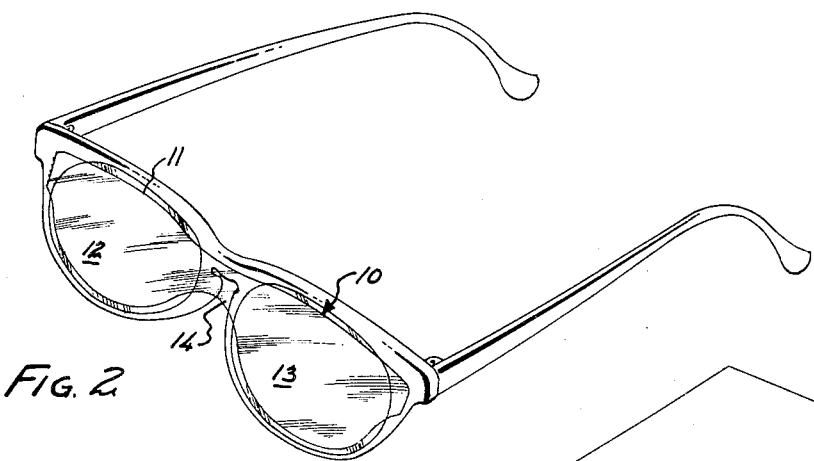
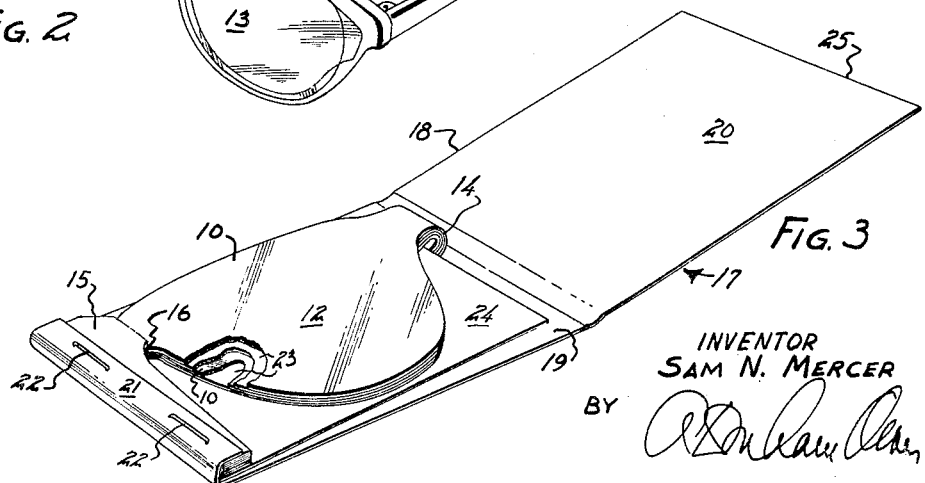
INVENTOR
SAM N. MERCER
BY
ATTORNEY

United States Patent Office 3,033,359
Patented May 8, 1962

3,033,359
DISPOSABLE LENS SHIELD
Sam N. Mercer, Tiburon, Calif.
Filed May 3, 1960, Ser. No. 26,559
2 Claims. (Cl. 206—47)

This invention relates to a lens shield. More specifically, this invention relates to a thin, transparent, flexible, disposable shield for attachment to the surface of optical lenses, particularly prescription-ground eyeglasses, and which, when tinted, transform the eyeglasses into sunglasses.

People who wear prescription-ground eyeglasses are faced with problems when the need arises for protection from glare and other harmful light rays. Two solutions usually are available; one, that of purchasing a separate set of prescription-ground sunglasses or, two, that of obtaining a clip-on form of sunglass which is installed on the prescription-ground eyeglasses.

Both of these alternatives are expensive. Prescription-ground sunglasses are, as a rule, more costly than untinted prescription eyeglasses, and purchase of such sunglasses involves a considerable investment for an item which is used relatively infrequently. Susceptibility to loss, breakage, scratching, and disagreeable bulkiness are other disadvantages.

The clip-on sunglass is not ground to a prescription and is less costly in initial outlay than its prescription-ground counterpart. However, the clip-on has disadvantages; its extra weight is quite uncomfortable and often causes the eyeglasses to drop out of the correct line of vision. Furthermore, some of the clip-on sunglasses change the prescription of the eyeglasses, so that viewing is considerably impaired and the wearer's eyes soon tire. These clip-ons also are subject to loss, breakage, and other damage, are bulky, and are awkward to install and remove.

In an effort to overcome these problems, various transparent plastic units, usually tinted or colored to reduce glare, with an adhesive on one side for affixing the device to the lens of the eyeglass, have been developed. There are good qualities present in this type. However, the adhesive is a serious disadvantage, for it has a habit of remaining behind on the lens, after the shield is removed, to cloud the lens and attract dust, lint, and other foreign matter. These shields are difficult to package and handle, and tricky to place properly on the eyeglass lens. Also, the adhesive adds to the cost of the item.

A problem distinct from that having to do with the prescription glasses discussed above is involved where painters and other industrial workers are plagued by the accumulation of paint specks, etc., on the lenses of their goggles. Cleaning the lenses heretofore required scraping with a razor-blade or other sharp instrument; serious damage to the lenses often resulted from this cleaning process and, in addition, it is quite time-consuming.

An important object of this invention is to provide a disposable lens shield for use on all types of eyeglasses.

Another object of this invention is the provision of a disposable, tinted lens shield for converting clear prescription-ground eyeglasses, or other clear spectacles, to sunglasses.

Still another object of this invention is the provision of an adhesive-free, self-adhering, disposable lens shield.

Another object of this invention is the provision of a novel means for packaging this disposable lens shield.

Still another object of this invention is the provision of a novel, compact package containing lens-cleaning tissues and a plurality of disposable lens shields.

Other objects and advantages will become apparent from the following description of a preferred form of the invention, taken in connection with the drawings in which:

FIG. 1 is a view in front elevation of the disposable lens shield;

FIG. 2 is a view in perspective of the lens shield in place on a pair of eyeglasses;

FIG. 3 is a view in perspective of a package of disposable lens shields and lens-cleaning tissues, with the cover open; and FIG. 4 is a view in side elevation of a package of lens shields and lens-cleaning tissues.

As illustrated in the drawings, the disposable lens shield 10 comprises a thin, flexible sheet of transparent material 11 in the shape of two lenses 12 and 13 and the bridgepiece 14 of a pair of eyeglasses. The tab 15, attached to one end of the disposable lens shield 10 through a perforated-line portion 16, serves as attachment means for securing the shield in a package 17. When the shield 10 is removed from the package 17, it is separated from this tab 15 by tearing along the perforated-line portion 16.

The material from which the lens shield 10 is constructed is an electrostatic-type of transparent plastic, such as that marketed under the trademark "Saran-Wrap." Because of the electrostatic nature of this material, it adheres readily to the eyeglass lens when placed in contact therewith, without need for adhesives or any other attaching means. Thus, no messy adhesive is present to soil the lens or to interfere with easy installation and removal of the lens shield, and the expense of the adhesive is eliminated.

The lens shield 10 can be placed easily upon any lens, and smoothed out by rubbing with a finger or by some smooth object, such as the edge of the package 17. When the shield 10 is of no further use, it may be removed simply by lifting one edge and peeling it away from the lens. Since no adhesive is present, none is left behind on the lens to cloud it and collect dirt and other foreign matter.

In its preferred form, the lens shield 10 is tinted with a dye to cut down transmission of harmful light rays through the lens. The color of the dye, such as green, gray, amber, etc., may be varied to suit the whim of the user. Direct light rays, as well as uncomfortable glare resulting from strong light rays bouncing off a reflected surface, are reduced materially by this tinted shield, in the same manner as by conventional sunglasses. Thus, prescription-ground eyeglasses are converted quickly, easily and economically into prescription-ground sunglasses.

A novel package 17 has been devised to hold a number of lens shields 10 in a compact and practical manner. As illustrated in FIGS. 3 and 4, this matchbook-type package 17 has a cover 18 comprising a back 19, a front 20, and a tab 21 for holding the front 20 in a closed position, all formed integrally from one section of paperboard. A plurality of lens shields 10, each separated from the other by a sheet of lens-cleaning tissue 23, is fastened to the inside of the cover 18 via staples 22. The lens-cleaning tissues 23 serve two purposes; (1) to separate the lens shields 10 from each other and so prevent their adhesion one to the other, and (2) as a handy cleaning device for the eyeglass lenses.

One preferred form of lens-cleaning tissue 23 is that treated with a silicone; such a tissue is marketed under the trademark "Sight Savers." The silicone renders the surface of the lenses resistant to accumulation of foreign matter. However, any type of lens-cleaning tissue may be used, so long as it can serve the dual purpose of separating the lens shields 10 from each other and cleaning the lenses of the eyeglasses.

To make the package as compact as possible, the lens shields 10 and lens tissues 23 are folded back 180° over a centrally positioned fibreboard support-member 24. The fold is substantially along the vertical centerline of the bridgepiece 14. When the bottom edge 25 of the cover-front 20 is inserted under the tab 21 to close the package, the lens shields 10 and the cleaning tissues 23 are enclosed and protected from abrasion or disarrangement when being carried.

Substantially any type of bendable, relatively thin paperboard material can be used to form the cover 18. The preferred material is coated paper stock which is smooth to the touch and pleasant in appearance. The package 17 may be used as an instrument for smoothing the lens-shield 10 when it is placed on the lens, and a smooth, polished surface on the cover 18 has less tendency to scratch or adhere to the lens shield 10.

Before a lens shield 10 is installed, it is preferable but not necessary to remove a cleaning tissue 23 from the package 17 and wipe the lens of the eyeglass to remove any foreign matter. This gives a nice, clean surface for the lens shield 10. When the shield 10 is removed, the lenses are left in their cleaned condition.

The lens-cleaning tissues 23 can be shaped in the form of the lens shields 10, as illustrated in FIG. 3. They also can be of other shapes, so long as they fit neatly in the package. A rectangular shape approximating the size of the package itself has been found to be very practical.

This invention fills the need for an economic product for public consumption, which other devices of this nature have failed to do. The cost of a package of these disposable lens shields is small, when compared with other types of disposable shields, and especially when compared with sunglasses. This package is distributed easily by the manufacturer and the retailer. The small size of the package is another advantage, as it occupies very little space in the pocket or handbag of the consumer.

The convenience of these lens shields in many situations is evident. Automobile drivers and passengers, as well as passengers on ships and airplanes, caught without sunglasses on a sunny day, find these disposable lens shields very helpful. Participants and spectators alike in outdoor sports use these lens shields to great advantage. Furthermore, at parades, bowl-theatre performances and any other public gatherings where the bright sun is discomforting, these lens shields have a ready market. The compact package makes them easy to distribute at such places through the concession salesmen.

In addition to use on prescription-ground eyeglasses, the lens shield 10 can be installed on other types of spectacles, such as those worn by industrial workers for protection of their eyes against foreign particles. One outstanding use of the lens shield 10 is as a disposable protective unit for glasses or goggles worn by painters, where these glasses and goggles are quickly spotted and/or smeared by paint. As many other uses will become apparent to the reader, no attempt will be made to enumerate all of them.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A matchbook-type package containing alternate leaves of (1) a lens shield consisting of a thin, transparent, flexible sheet of electrostatic material having the configuration of the two lenses and the bridgepiece of a pair of eyeglasses and (2) a sheet of lens-cleaning tissue, with the lens shields and the lens-cleaning tissues folded back approximately 180°, as a unit, along a line through the bridge piece portion of said lens shields, and with the fold supported by a relatively heavy, rigid section of paperboard.

2. A matchbook-type package of disposable sunglasses, comprising: a plurality of alternate leaves of (1) a thin, transparent, tinted, flexible, electrostatic plastic, and (2) a silicone treated, lens-cleaning tissue, all leaves shaped substantially in the configuration of the two lenses and the joining bridgepiece of a set of eyeglasses; a center, substantially rectangular-shaped, stiff paperboard support around a first end of which the said leaves are folded so that the area corresponding to one spectacle-lens is on one side of the said support and the area corresponding to the other spectacle-lens is on the opposite side of the said support; and a matchbook-like folded cover, enclosing the said leaves and the said support, and joined thereto, comprising a front, a back, and a closure-tab.

References Cited in the file of this patent

UNITED STATES PATENTS

| | | |
|---|---|---|
| 1,172,718 | Lennards | Feb. 22, 1916 |
| 1,805,396 | Havens | May 12, 1931 |
| 2,029,245 | Lyon | Jan. 28, 1936 |
| 2,511,329 | Craig | June 13, 1950 |
| 2,586,009 | Dickey | Feb. 19, 1952 |
| 2,901,752 | Granger | Sept. 1, 1956 |

OTHER REFERENCES

Silicones and Their Uses by Rob Roy McGregor; McGraw-Hill Book Co., Inc., article on Applications of Dimethyl Silicone Fluids, p. 57, 1st paragraph. This book may be found in Division 25, TP 248, S5M3, C4.